May 20, 1930. W. C. STEVENS 1,759,669
METHOD AND APPARATUS FOR BUILDING TIRE BEADS
Filed Oct. 11, 1926 4 Sheets-Sheet 1

INVENTOR.
WILLIAM C. STEVENS.
BY
ATTORNEY.

May 20, 1930.  W. C. STEVENS  1,759,669
METHOD AND APPARATUS FOR BUILDING TIRE BEADS
Filed Oct. 11, 1926   4 Sheets-Sheet 4
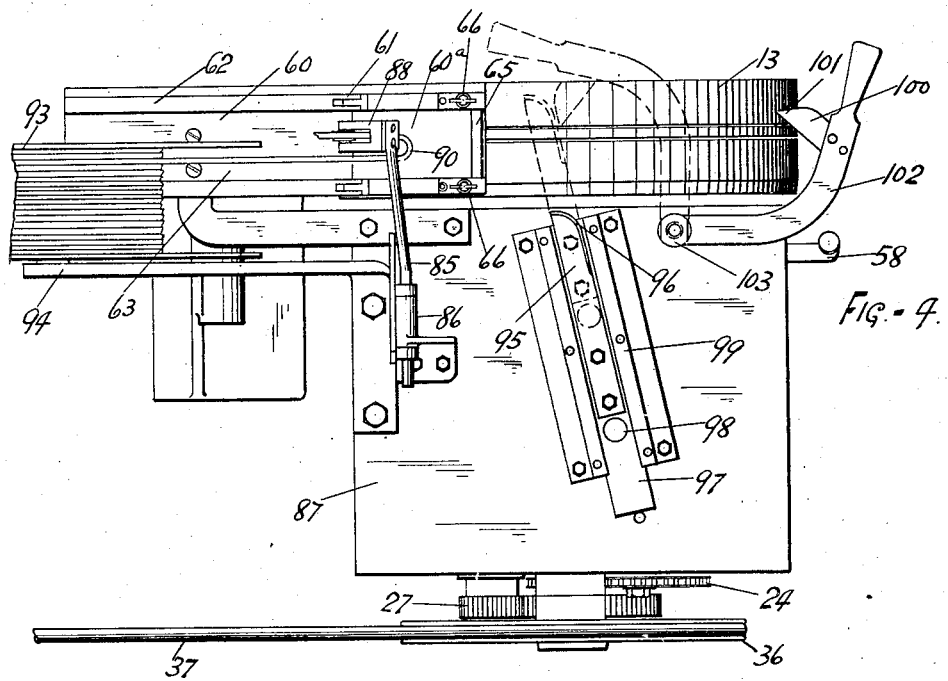
FIG.-4.
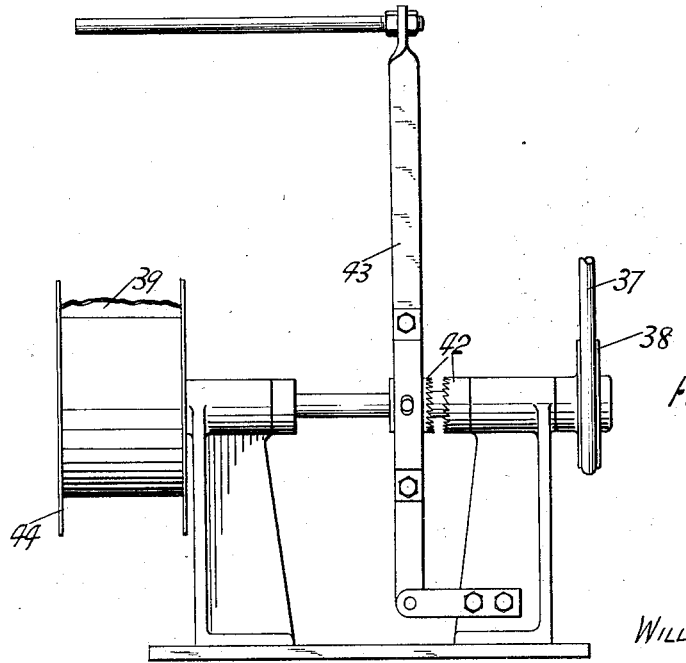
FIG.-11.
INVENTOR.
WILLIAM C. STEVENS.
BY 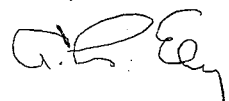
ATTORNEY.

Patented May 20, 1930

1,759,669

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

METHOD AND APPARATUS FOR BUILDING TIRE BEADS

Application filed October 11, 1926. Serial No. 140,804.

This invention relates to procedure and apparatus for building beads for use in pneumatic tires and particularly to methods and apparatus for building complete "green" or unvulcanized beads adapted to be mounted into tires as such and to be cured in the tires, this invention being an improvement on the machine disclosed in my copending application, Serial No. 36,898, filed June 13, 1925.

Important general objects of the invention are to provide an improved procedure for building tire beads, and an improved apparatus for quickly, uniformly and cheaply carrying out the steps of the procedure.

One object is to provide apparatus comprising a novel drum constructed to turn the bead "flipper" fabric about the bead wire and filler.

Another object is to provide means for guiding a covering and bead "flipper" fabric onto said drum.

Another object is to provide means for guiding bead wire onto the fabric on the drum.

Another object is to provide a device for guiding and applying a bead filler onto the wire on the drum.

Another object is to provide spinners or stitchers for forming the "flipper" on said bead by operations on said fabric.

The foregoing and other objects will be more readily understood as the following description is read in connection with the accompanying drawings, it being understood that the invention is not limited to the specific form thereof shown and described.

Of the accompanying drawings,

Figure 4 is a plan of said part thereof;

Figure 5 is a detail of the fabric attaching means;

Figures 6 and 7 are detail sections of the drum illustrating progressively the steps of the bead-building process performed thereon;

Figures 8 and 9 are detail elevation and plan views respectively, of the stitcher blades illustrating their operation on the flipper fabric;

Figure 10 is a perspective view illustrating a portion of a completed bead; and

Figure 11 is a right end elevation of means for winding the liner fabric.

Figure 1:
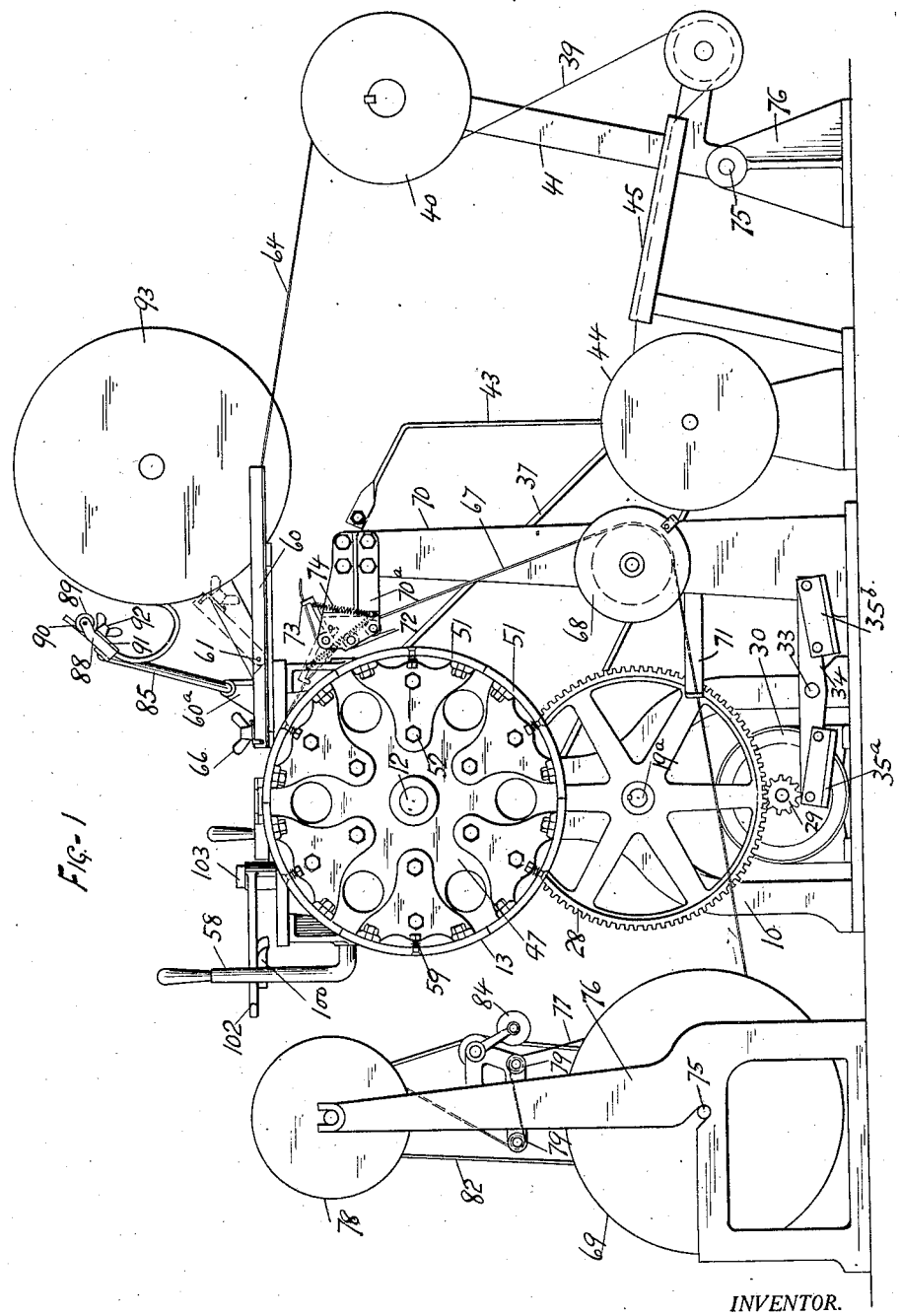
Figure 1 is a front elevation of a machine embodying and adapted to carry out the invention.

Referring to the drawings, 10 represents a standard having journaled therein at 11 a shaft 12, on one end of which is secured a drum 13 later to be more fully described, and on the other end of which is secured a friction driven pulley 14. Arranged to drive pulley 14 is a friction roller 15 journaled on a spindle 16 carried by a bracket 17 pivoted on a tubular bushing 19 journaled at 20 in standard 10 and also a friction roller 21 journaled on a spindle 22 carried by said bracket. Roller 15 is rotatively secured to a sprocket 23 having trained thereover a chain 24 which is also trained over a drive sprocket 25 secured on shaft $19^a$ journaled in bushing 19. Roller 21 is rotatively connected to a gear 26 meshed with a gear 27 secured on shaft $19^a$. Shaft $19^a$ also has thereon a gear 28 meshed with a gear 29 on the shaft of a motor 30 for driving rollers 15 and 21 in reverse directions and at different speeds.

In order to engage either roller 15 or roller 21 with friction pulley 14, bracket 17 is connected by a link 31 to an arm 32 on a rock shaft 33, adapted to be rocked in one direction or the other to engage one drive roller or the other with pulley 14 by means of a double pedaled lever 34 secured at its center on shaft 33 and having pedal $35^a$ on one end and a pedal $35^b$ on the other.

A belt pulley 36 is attached to shaft 12 and has trained thereover a belt 37, which in turn engages pulley 38, as shown in Figure 11, and operating as a means for winding the fabric liner 39 which is used to separate the layers of the flipper fabric on the supply roll 40 mounted on an angularly adjustable standard 41. Pulley 38 is adapted to drive clutch members 42, 42, the latter being brought into and out of engagement by lever 43. When the clutch members are in engagement, they rotate the liner fabric reel 44 unto which the liner fabric 39 is fed from guiding plate 45 mounted on standard 41.

Figure 2:
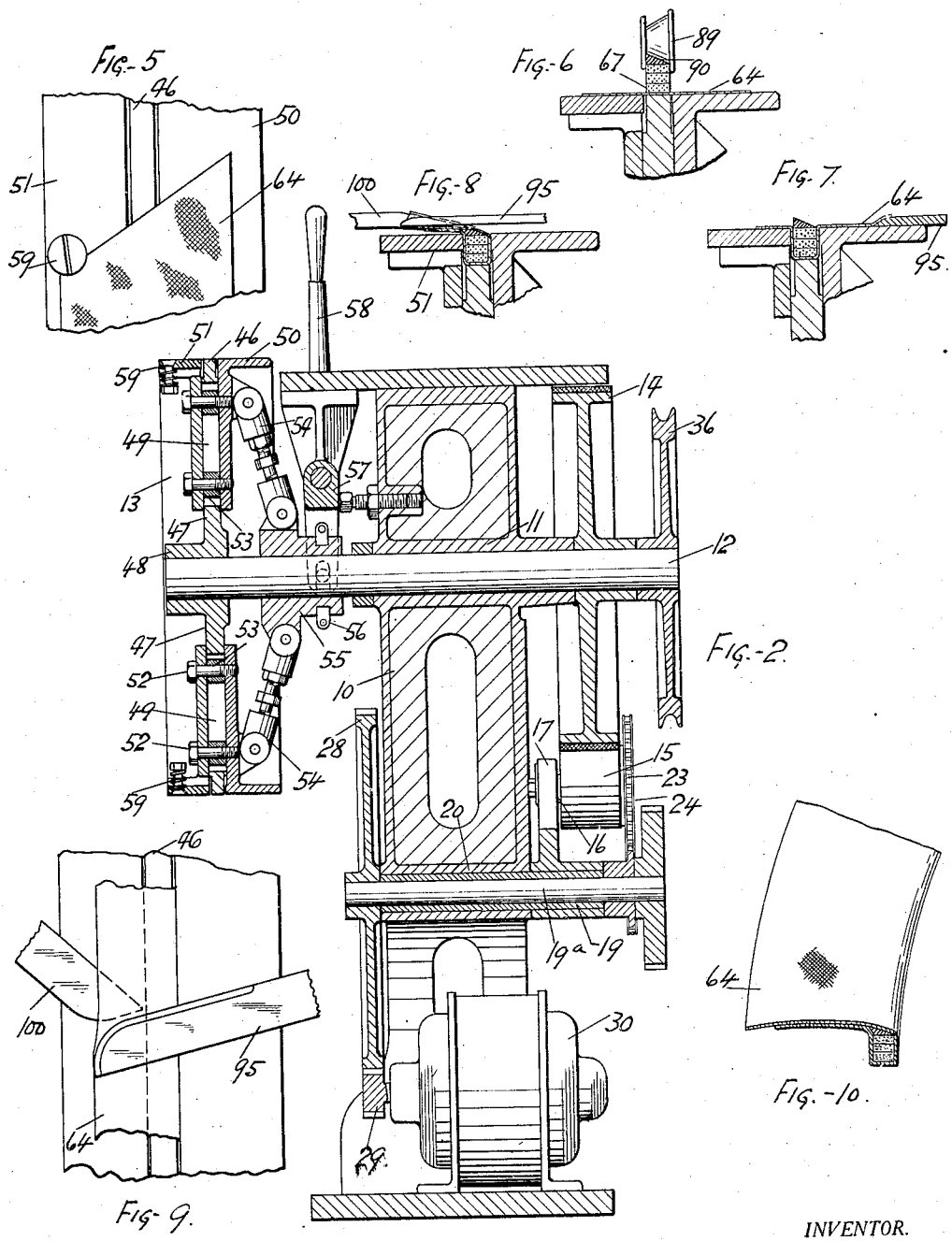
Figure 2 is a transverse vertical section thereof.
Figure 3:
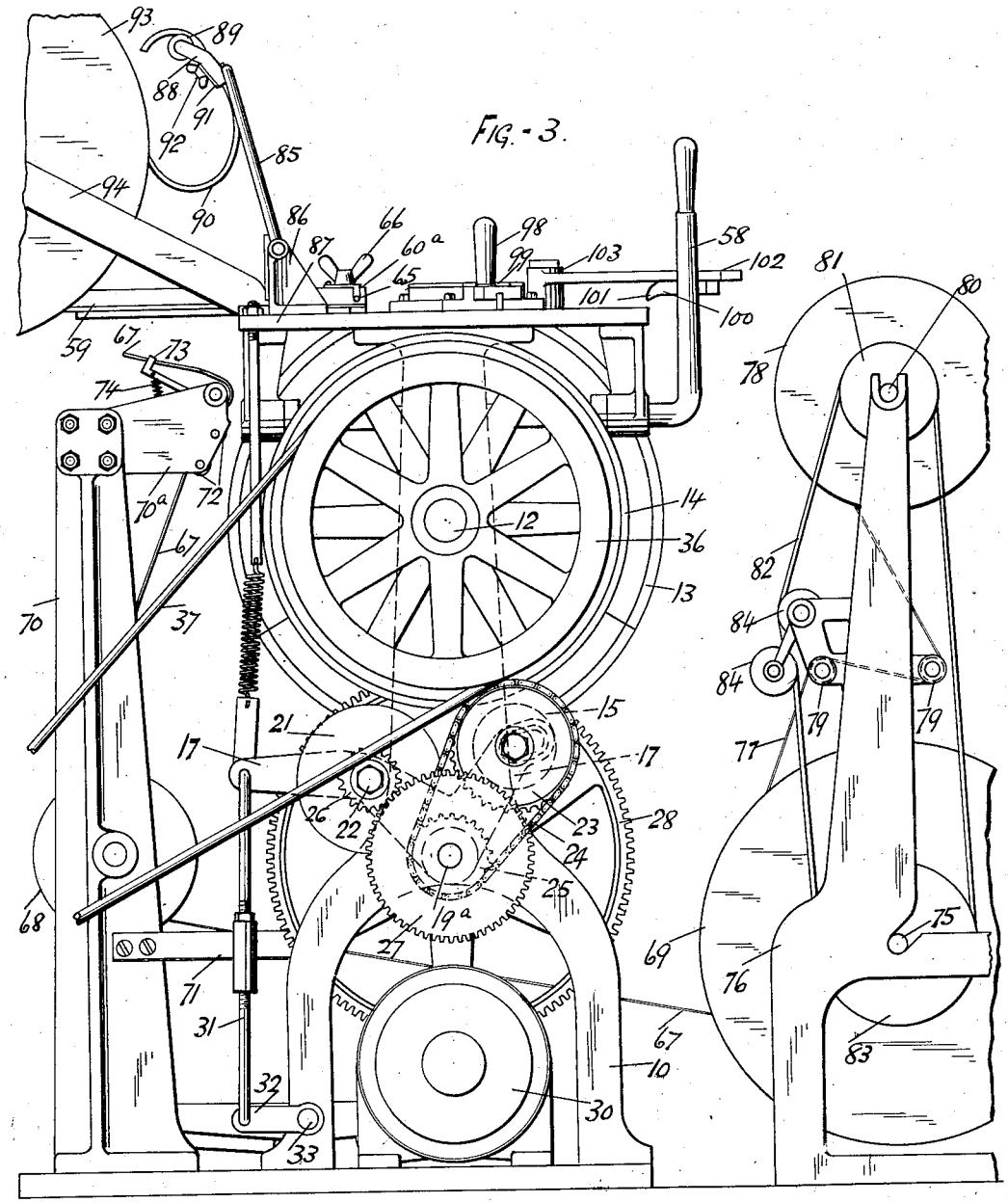
Figure 3 is a rear elevation of a part thereof.

As best shown in Figure 2, the drum 13 includes a fixed central portion 46 formed on spider arms 47, 47 which in turn are formed on a central hub 48 secured on shaft 12. Arms 47 are each slotted as at 49, 49 and slidably mounted on each arm are segments 50 and 51 arranged in pairs on opposite sides of the fixed portion 46 of drum 13. Segments 50 and 51 are secured in pairs to move together as units by means of bolts 52, 52 passing through slots 49 and having anti-friction rollers 53, 53 thereon engaging in the slots 49 to guide movements of the segments. Segments 50 and 51 are so formed that when in collapsed condition they form with portion 46 a substantially smooth comparatively broad flat-surface drum (Figure 6). When expanded as shown in Figure 7, the segments 50 and 51 are adapted to form with portion 46 a drum having a peripheral groove therein. Expanding action of the segments 50 and 51 is provided to perform the operation of turning the covering and flipper fabric about the wire and filler of the bead (Figure 6).

Expansion and contraction of segments 50 and 51 are accomplished by adjustable toggle levers 54, 54 secured to segments 50 and 51 and to a central collar 55 shiftable on shaft 12 by means of a yoke 56 (Figures 1 and 2) pivoted on brackets 57 and operable by a hand lever 58. Through the center of the face of each of the outer segments 51, near their outer margins, are mounted countersunk spring-pressed bolts 59 for a purpose which will later appear.

The flipper fabric guiding device consists in a guide plate 60 having a hinged portion 60ª pivoted at 61 so as either to lie tangentially to the periphery of drum 13 or to be swung upwardly as indicated by the dotted lines in Figure 1. The plate 60 has a guide bar 62 secured on one side thereof and a guide bar 63 adjustably secured on the other side thereof between which the flipper fabric indicated at 64 may be properly guided onto drum 13. Rod 65 is arranged transversely at the end of hinged guide plate portion 60ª on guide bars 62 and 63 so that the fabric passing over the guide plate 60ª will pass under the rod and will be thus held between the bars, the rod being held in place by thumb-screws 66, 66.

To feed the bead wire indicated at 67, which is usually in the form of a flat tape of braided wire which has been rubberized, onto the fabric 64 on drum 13 over the portion 46 of said drum, a roll 68 for guiding the wire from the supply reel 69, is mounted on a standard 70 arranged adjacent standard 10. A guiding device 71 is employed to guide the wire onto roll 68, which is arranged to rotate in the plane of drum 13 and from this roll the wire is guided over rollers 72, 72 supported by spaced brackets 70ª attached to standard 70. After passing over rollers 72, 72 the wire is passed through a perforation in hinged guiding member 73 pivoted to brackets 70ª. Spring 74 is adapted to hold guiding member 73 either out of operative position as shown in Figure 1 or into guiding position as indicated by the dotted lines. The supply reel 69 is mounted on a shaft 75 journaled in standard 75 and as the bead wire 67 is unwound therefrom, the strip of fabric or liner 77 which is used to separate the layers of the wire, is wound onto reel 78, being guided thereon by a suitable level-wind mechanism 79, 79. Reel 78 is supported by a shaft 80 journaled in the upper end of standard 76 and on this shaft is provided pulley 81 is a belt 82 which in turn is carried over pulley 83 mounted on shaft 75 for rotation of reel 69, so that rotation of reel 69 causes reel 78 to rotate and wind up the liner 77. Proper tension on belt 82 is provided by idler pulleys 84, 84.

The filler strip applying device consists of an arm 85 journaled in standard 86 which is mounted on a table 87 supported by standard 10, said arm being adapted to be swung so that its end moves in the plane of rotation of drum 13. The bracket 88 on the outer end of arm 85 is provided with a guiding groove and a roller 89. The guiding groove is shaped to conform to the cross-sectional configuration of the filler strip 90, the said groove being covered by a plate 91 attached by thumb-screw 92. The filler strip is fed through this guiding means from a supply reel 93 journaled on bracket 94 which in turn is mounted on table 87.

The flipper stitchers comprise one stitcher blade 95 formed with a beveled edge 96 and carried by a slide 97 operable by a handle 98 in a guide 99 secured on table 87, and a second stitcher blade 100 formed with a beveled downwardly turned edge 101 and carried by a lever 102 pivotally mounted at 103 to table 87. Blade 95 is thus adapted to be urged transversely of drum 13 at a slight angle due to the setting of guide 113 on plate 114. Blade 95 is normally adapted to lie against the surface of drum 13 so as to pass under the flipper fabric in the manner illustrated in Figure 7, but is also adapted to spring upwardly to pass over the double thickness of fabric which is formed on drum 13 to provide the flipper of the bead. Blade 100 is adapted to be swung into a position just forward of that taken by blade 95 when the latter is advanced, as illustrated by the dotted lines in Figure 4 and in Figure 9. The beveled downwardly turned edge 101 is adapted to pass under fabric 64 to expand the same to the level of the outer edge of bead filler 90 and to stitch said fabric against the vertical face of said filler.

The method and operation of the apparatus is carried out by first feeding a strip of bias-cut rubberized fabric 64 of the proper width onto drum 13, segments 50 and 51 being contracted to the level of the periphery of central portion 46 and a forward corner of the fabric being caught under the head of spring-pressed bolt 59 (Figure 5). Roller 15 is employed to drive the drum slowly in a counter-clockwise direction to apply the fabric, the latter being drawn onto the drum and accurately guided thereon by its passage over guide plate 60 between bars 62 and 63 and under rod 65. When a complete convolution of fabric has been applied, rotation of the drum is stopped, clutch members 42, 42 disengaged, and the fabric cut to the proper length to form a slightly lapped splice on the drum.

Guiding member 73 is next swung downwardly to apply the bead wire 67 over the fabric on the drum, the position of the wire on the fabric being directly over central portion 46 of the drum. Driving of drum 13 counter-clockwise slowly is resumed, and the bead wire is drawn onto the drum 13 one convolution on the other until the proper number, in the present case illustrated, three complete convolutions, have been applied. Drum 13 is then stopped, the wire cut, and guiding member 73 swung back out of operative position.

The next operation consists in the application of the rubber filler strip 90. This is accomplished by swinging arm 85 so that roller 89 overlies the bead wire already applied. Filler strip 90 is then fed under roller 89 onto the bead wire while drum 13 is again slowly rotated counter-clockwise and pressure is applied on arm 85 to stick the strip to the bead wire (Figure 6). When a complete convolution of the filler strip has been drawn onto the bead wire, the drum 13 is stopped, the strip cut, the applying device swung up out of operative position and the ends of the convolution spliced together on the bead wire.

The succeeding operation consists in turning the covering and flipper fabric outwardly about the bead wire and filler. This is accomplished by first rapidly rotating drum 13 clockwise by means of roller 21 and operating lever 58 to urge collar 55 forwardly from the position shown in Figure 2 whereby toggles 54 will expand segments 50 and 51. Centrifugal force, due to the rapid rotation of the drum 13, greatly assists the expansion of segments 50 and 51 so that comparatively slight pressure is required on lever 58. When this operation is complete, the drum 13 is stopped and the work is in the condition shown in Figure 7.

The final operation of forming the bead is accomplished by rapidly rotating the expanded drum clockwise and by comparatively slowly swinging stitcher 100 transversely of the drum, first engaging edge 101 under the forward edge of the flipper fabric and passing the stitcher under the fabric until the latter is stitched against the vertical edge of the projecting filler strip 90 and the fabric is expanded to the level of the periphery of the strip. While stitcher 100 is held in position under the expanded fabric, stitcher 95 is slowly moved transversely of the drum by means of handle 98 (Figure 4). As shown in Figure 7, the blade 95 first engages under the rear edge of the flipper fabric and passes forwardly thereunder, separating it from the drum. When the stitcher blade 95 engages the rear edge of the bead material in the groove of the drum 13, the rear portion of the flipper fabric on segments 50 is caused suddenly to swing about the rear corner of the bead over the bead wires and onto the forward expanded portion of the flipper on segments 51. Continued rotation of drum 13, and forward transverse feeding of blade 95 and cooperation of the latter with stitcher 100 to engage the two margins of the fabric therebetween, stitches the rear portion of the flipper fabric in place over the bead wires and onto the forward expanded portion of the flipper fabric to provide the bead flipper. This operation is illustrated in Figure 9. It will be noted that blade 109 will yield sufficiently to pass over the bead without destroying the covering and flipper fabric. The completed bead on the drum 13 is illustrated in Figure 8.

Removal of the bead from drum 13 is effected by operating lever 58 to collapse segments 50 and 51 whereupon the bead is slipped forwardly axially over segments 50. A portion of completed bead when removed from the drum is illustrated in Figure 10. It will be noted that the flipper will have contracted inwardly at its forward edge, due to the tendency of the fabric to return to its original non-stretched condition.

It will appear from the foregoing that applicant has devised an exceedingly simple and effective device for rapidly turning out tire beads for use in penumatic tire casings. It will also appear that an effective and practical method of building beads has been devised which include the steps of forming transversely flat band of fabric, applying convolutions of core forming material including the wire and filler to the band intermediate of its edges, stretching the band outwardly about the core to cover the sides thereof, expanding one side of the band and stitching it against the side of the core, and turning the other side of the band over the bead and stitching it in place onto the band on the first named side of the bead to complete covering the core and to form the flap. Modifications of the invention may be resorted to without departing from the spirit thereof or the scope of the appended claims.

What is claimed is:

1. Apparatus for building beads comprising a rotatable drum having a fixed peripheral portion and expansible portions on each side of said fixed portion, means for guiding a strip of fabric onto said drum, said means including a guide plate having spaced guidebars relatively adjustable thereon and a cross rod overlying said plate; means for guiding a strip of core forming material onto said drum, said means including spaced brackets between which the material passes and rollers between the brackets over which the material passes; means for applying a filler strip on the drum, said means including a grooved roller movable onto or away from the drum and means for supplying the filling strip to said roller; means for expanding or contracting the expansible portions of the drum; means for expanding one side of the fabric against the side of the core and means for turning the other side of the band over the core onto the first named side thereof, said two means including stitcher blades movable transversely over the surface of the drum from opposite sides thereof; and means for driving the drum at different speeds, said means including a friction pulley and friction rollers continuously driven at different speeds movable interdependently toward and from the friction pulley or to a neutral position.

2. Apparatus for building beads comprising a rotatable drum having a fixed peripheral portion and expansible portions on each side of said fixed portion, means for guiding a strip of fabric onto said drum, means for guiding a strip of core forming material onto said drum, means for applying a filler strip on the drum, means for expanding or contracting the expansible portions of the drum, means for expanding one side of the band against the side of the core, means for turning the other side of the band over the core onto the first named side thereof, and means for driving the drum at different speeds.

3. Apparatus for building beads comprising a rotatable drum having a fixed peripheral portion and expansible portions on each side of said fixed portions, means for guiding a strip of fabric onto said drum, means for guiding a strip of core forming material onto said drum, means for expanding or contracting the expansible portions of the drum, means for expanding one side of the band against the side of the core, means for turning the other side of the band over the core onto the first named side thereof, and means for driving the drum at different speeds.

4. In bead building apparatus, a drum having a peripheral groove therein, the drum on either side of the groove being contractile to form a substantially flat-surfaced drum, and stitchers movable over the surface of the drum across the groove therein, and from opposite sides thereof.

5. The method of making beads comprising disposing a band of fabric into cylindrical form, shaping a peripheral groove in said band, applying a core on the band so that it will lie in the groove, rapidly rotating the band, expanding the fabric on one side of the groove, and moving the other edge of the fabric transversely of the band and across the groove while said band is rapidly rotating to stitch the fabric about the core and onto the expanded fabric on the other side of the band.

6. In bead building apparatus, a normally flat segmental drum, adapted to have a fabric band applied about its periphery and expansible to provide a peripheral groove intermediate its edges for locating a core on the drum about said fabric band, a stitcher movable over the drum from one side thereof to expand one side of the fabric band against the side of the core and a stitcher movable from the other side of the drum across the groove to fold the other side of the fabric around the core and cooperable with the first named stitcher to stitch together the two sides of the fabric band.

WILLIAM C. STEVENS.